United States Patent [19]

Li et al.

[11] 4,028,305

[45] June 7, 1977

[54] VULCANIZABLE ELASTOMERS DERIVED FROM THIODIETHANOL

[75] Inventors: Tsi Tieh Li, Milltown; Robert Saxon, Princeton, both of N.J.

[73] Assignee: American Cyanamid Company, Stamford, Conn.

[22] Filed: Oct. 31, 1975

[21] Appl. No.: 627,648

Related U.S. Application Data

[63] Continuation-in-part of Ser. No. 534,545, Dec. 19, 1974, abandoned.

[52] U.S. Cl. .............................. 260/75 S; 260/40 R; 260/75 UA
[51] Int. Cl.² ................. C08G 63/54; C08G 63/68
[58] Field of Search ...................... 260/75 S, 75 UA

[56] References Cited

UNITED STATES PATENTS

| | | | |
|---|---|---|---|
| 2,221,418 | 11/1940 | Weihe | 260/75 S |
| 2,729,618 | 1/1956 | Muller et al. | 260/75 S |
| 2,813,086 | 11/1957 | Robitschek et al. | 260/75 S |
| 2,988,532 | 6/1961 | Nischk et al. | 260/75 S |
| 3,463,750 | 8/1969 | Ghosh | 260/75 UA |

FOREIGN PATENTS OR APPLICATIONS

| | | |
|---|---|---|
| 541,893 | 2/1956 | Belgium |
| 2,028,169 | 12/1971 | Germany |

*Primary Examiner*—Howard E. Schain
*Assistant Examiner*—W.C. Danison, Jr.
*Attorney, Agent, or Firm*—Frank M. Van Riet; William J. van Loo

[57] ABSTRACT

Vulcanizable elastomeric compositions are disclosed which are the reaction products of 80 to 90 mole percent of a mixture of thiodiethanol and one or more aliphatic or cycloaliphatic diols and 20 to 10 mole percent of an aromatic or cycloaliphatic dicarboxylic acid wherein the diol content is at least 50 mole percent thiodiethanol and about 1 to 10 mole percent of a diol providing pendant allylic unsaturation.

4 Claims, No Drawings

VULCANIZABLE ELASTOMERS DERIVED FROM THIODIETHANOL

CROSS-REFERENCES TO RELATED APPLICATIONS

This application is a continuation-in-part of application Ser. No. 534,545, filed Dec. 19, 1974, now abandoned.

This invention relates to elastomeric compositions which comprise the polymeric chain reaction product of from 80 to 90 mole percent of a mixture of thiodiethanol and one or more aliphatic or cycloaliphatic diols and, correspondingly, from 20 to 10 mole percent of an aromatic or cycloaliphatic dicarboxylic acid, wherein at least 50 mole percent of the diol content is thiodiethanol and from about 1 to 10 mole percent of the diol content is a diol which provides an allylic double bond in a group pendant from the polymeric chain.

U.S. Pat. No. 2,221,418 teaches that condensation products of thiodiethanol with aliphatic dicarboxylic acids and polycarboxylic acids can be obtained.

German Offenlegungsschrift No. 2,028,169 teaches similar preparations wherein part of the sulfur content is in the form of sulfonium ions to provide hydrophilic polymers.

Belgian Pat. No. 541,893 teaches copolyesters based on ethylene glycol and thioglycols obtained by transesterification of the ethylene glycol polyester with thioglycols under hydrolytic reaction conditions.

U.S. Pat. No. 2,813,086 teaches sulfur-containing polyesters in which the sulfur content is provided by the acid content rather than the diol content.

U.S. Pat. No. 3,463,750 teaches the reaction product of (A) an aromatic acid having at least 3 carboxy groups, (B) an allyl ether of at least 3 hydroxyls, one of which is not etherified, (C) an aliphatic or aromatic dibasic acid, and (D) an alcohol of at least 2 free hydroxyl groups.

Not all of these references are concerned with elastomeric compositions, but those that are, are deficient in such use for one or more reasons. Compositions which do not contain allylic unsaturation as a pendant group do not provide the most desirable elastomer properties. Those that contain a sulfur content provided by the acid content are limited in sulfur content and therefore are limited in properties provided by the sulfur content. Those that rely on transesterification to provide the sulfur content require multiple step processes that complicate preparation.

Thus, in spite of the extensive prior art relating to sulfur-containing polyesters for elastomeric compositions, there continues to exist the need for readily produced, sulfur-containing, allylically unsaturated polyesters for elastomeric compositions that are free of the deficiencies of the prior art materials.

In accordance with the present invention, there is provided a vulcanizable elastomeric composition comprising the polymeric chain reaction product of 80 to 90 mole percent of a mixture of thiodiethanol and one or more aliphatic or cycloaliphatic diols and, correspondingly, from 20 to 10 mole percent of an aromatic or cycloaliphatic dicarboxylic acid wherein at least 50 mole percent of the diol content is thiodiethanol and from about 1 to 10 mole percent of the diol content is a diol which provides an allylic double bond in a group pendant from the polymeric chain, said reaction product having a Mooney value of about 20 to 60.

The present invention provides high molecular weight, rubbery, vulcanizable elastomeric compositions which, when vulcanized by conventional techniques, produce elastomers exhibiting low temperature flexibility and outstanding resistance to hydrocarbon oils.

The present invention provides vulcanizable elastomers having significantly higher Mooney viscosities than are readily obtainable by other procedures. Mooney viscosity is a measure of the "toughness" of an elastomer and is manifested by mill handling characteristics, i.e. the higher Mooney elastomers are more readily processed on a rubber mill. This is an important property of a "millable" or "vulcanizable" gum.

As is known, when a diol reacts with a dicarboxylic acid, the product is polymeric because of the difunctionality of both rectants. The polymer will have a linear chain contributed in part by the acid and in part by the diol. The structural elements of the polymer chain contributed by the dicarboxylic acid will consist of the carboxylic acid groups and the structural elements that separate the two acid groups in the dicarboxylic acid structure. Side chain groups that do not separate the two acid groups do not contribute to the polymeric chain but provide pendant groups therefrom. Similarly, the structural elements of the polymer chain contributed by the diol will consist of the two hydroxyl groups and the structural elements that separate the two hydroxyl groups of the diol. Side chain groups that do not separate the two hydroxyl groups do not contribute to the polymer chain but provide pendant groups therefrom. It is, of course, understood that the linkage formed in building the polymeric chain is an ester group resulting from interaction of an acid group and a hydroxyl group. The polymeric chain is also referred to as the polymer "backbone" from which other groupings may be pendant.

Thiodiethanol as used in the present invention has the structure $HOCH_2CH_2SCH_2CH_2OH$. Polythiodiethanol, copolymers of thiodiethanol with aliphatic diols, and polyesters of thiodiethanol with linear aliphatic dibasic acids that contain terminal thiodiethanol groups will not condense with aromatic or cycloaliphatic dicarboxylic acids to provide useful elastomers as defined in the present application. That fact that such polymeric materials will not react with aromatic or cycloaliphatic dicarboxylic acids to provide elastomeric compositions with a high Mooney viscosity is an unexpected feature of the present invention.

Moreover, it has been found that when the elastomeric composition contains less than about 10 mole percent of the aromatic or cycloaliphatic dicarboxylic acid component, high Mooney viscosity is not readily obtained, and when it contains more than about 20 mole percent of the aromatic or cycloaliphatic dicarboxylic acid, the glass transition temperature ($T_g$) is raised to the level where the composition, although it may be elastomeric at room temperature embrittles at temperatures which may be encountered in use, e.g. in winter weather, and hence such compositions are less desirable than those containing less than about 20 mole percent of the aromatic or cycloaliphatic dicarboxylic acid.

The term "high Mooney viscosity" as used herein means a Mooney viscosity (ML-4), as determined by ASTM No. D1646, of about 20 to about 60. Mooney viscosity, as previously indicated, is a measure of mill processing characteristics. Natural rubber, e.g., has a Mooney viscosity of about 60, which is high because of naturally occurring crosslinking. Natural rubber, therefore, must be "broken down" on the rubber mill before compounding ingredients can be incorporated therein. Most synthetic elastomers have Mooney viscosities in the range of about 20 to 50. Although elastomers having lower Mooney viscosity, i.e. in the range of 5 to 20, can be handled on a rubber mill with difficulty, it is far more desirable to compound elastomers with Mooney viscosities in the range of 20 to 60, preferably 35 to 50. In accordance with the present invention, therefore, polymers prepared in accordance with the procedures described herein are elastomeric, possess excellent low temperature properties and outstanding resistance to hydrocarbon oils when compounded and cured according to conventional procedures and, in addition, have excellent gum strength, as manifested by high Mooney viscosities, as defined above.

The polymeric reaction product of the present invention will contain three essential ingredients. In addition to the content of thiodiethanol, the product will also contain a diol providing pendant allylic unsaturation and an aromatic or cycloaliphatic dicarboxylic acid in the proportions previously specified, such contents being in the form of the esterification reaction products. It will be appreciated that since the minimum required amounts of both thiodiethanol and the diol furnishing pendant allylic unsaturation do not constitute the total required amount of diol specified, use is contemplated of one or more additional diols that differ from the two required diols. It is generally preferred to use up to about 40 mole percent of an aliphatic or cycloaliphatic diol free of sulfur and allylic unsaturation for this purpose.

Any aliphatic diol which will condense with the aromatic or cycloaliphatic dicarboxylic acids used in the present invention may be used to satisfy the total diol content. Useful diols are illustrated by but not limited to the following which are representative: ethylene glycol, propane-1,2-diol, propane-1,3-diol, diethylene glycol: cyclohexane di(lower alkylene) diols, such as cyclohexane 1,2-dimethanol and 1,4-dimethanol, either cis or trans mixtures thereof, cyclobutane di(lower alkylene) diols such as cyclobutane-1,2-dimethanol: aralkylene diols, such as the bis (hydroxyethyl) ether of hydroquinone or resorcinol: and the like. Preferred saturated diols include diethylene glycol and butane-1,4-diol.

Diols that furnish pendant allylic unsaturation include but are not limited to the monoallyl ether of trimethylol propane, the monoallyl ether of glycerol, and 3-cyclohexene-1,1-dimethanol, with the monoallyl ethers of aliphatic triols being preferred.

The dicarboxylic acids useful in the present invention include aromatic and cycloaliphatic dicarboxylic acids. Representative aromatic dicarboxylic acids include terephthalic acid (preferred), phthalic acid or anhydride, isophthalic acid, naphthalene-1,4-dicarboxylic acid, and naphthalene-1,5-dicarboxylic acid. Representative cycloaliphatic acids include hexahydro-o-phthalic acid (cis or trans) hexahydro-p-phthalic acid (cis or trans), and the like.

The polymeric chain reaction products of the present invention are prepared under dehydrating conditions using an acidic catalyst. Acids having a pK of 5 or less are useful. Certain acid catalysts, although effective, tend to produce undesirable side reactions leading to odoriferous thioxane and/or dithiane, and are therefore to be avoided. Suitable catalysts include hydrogen chloride, sulfuric acid, p-toluene sulfonic acid, sulfamic acid, picric acid, fluoboric acid, phosphorous acid, trialkyl phosphites, and the like. Phosphorous acid and fluoboric acid are preferred catalysts. Effective catalysis is achieved using 0.01 to 3 percent by weight, based on the total weight of the reactants, preferably 0.1 to 1 weight percent, same basis.

The polymers are readily prepared by condensing the reactants in the presence of the appropriate catalyst and under an inert atmosphere, e.g. nitrogen, for about 4–6 hours at about 180°–200° C until the major portion of water formed in the reaction is removed, followed by a similar reaction at reduced pressure, e.g. 5–10 mm Hg., at a temperature of 160°–180° C for a suitable period of time, e.g. 10–24 hours, to complete the condensation from a low molecular weight polymer in syrup form to a gum having a high Mooney viscosity, as specified. The latter reaction is conveniently conducted using a high shear mixer, such as an Atlantic 2CV reactor, available from Atlantic Research Co., Gainsville, Virginia. Other suitable high shear mixers may be used to effect molecular weight buildup.

The mill handling characteristics of the elastomers are evaluated by the so-called Mooney value (ML-4). The Mooney value is measured according to ASTM No. D1646.

The elastomers have excellent low temperature flexibility as measured by thermomechanical analysis, e.g. using a duPont Thermomechanical Analyzer, Model 990, Module 942. The method basically measures the first transition temperature of a specimen which is warmed from −120° C in contact with a weighted, needle-like probe. The transition temperature is determined from the first deflection point on a continuously recorded chart. This first transition temperature is analogous to the glass transition temperature ($T_g$) and is referred to herein as brittle point.

Similarly, the elastomers have outstanding resistance to hydrocarbon oils, as evidenced by low volume swell in contact with the oils. This is measured in accordance with ASTM No. D471.

The elastomers of this invention can be cured into useful elastomeric products by conventional compounding and vulcanization using standard rubber compounding techniques. They may be compounded with conventional compounding ingredients such as carbon black or other pigments and fillers, vulcanizing agents such as accelerators and sulfur, promoters such as zinc oxide, lubricants and mold release agents, antioxidants, plasticizers and the like, and compression molded into useful elastomeric products.

The invention is more fully illustrated by the following examples.

EXAMPLE 1

Thiodiethanol (300 grams, 2.5 moles), terephthalic acid (58 grams, 0.35 mole), monoallyl ether of trimethylolpropane (26 grams, 0.15 mole) and 1 gram phosphorous acid were reacted under nitrogen for 1.5 hours at 195° C., for 5 hours at 185° C. and finally distilled to remove the remaining water and unreacted diol.

To an Atlantic 2CV Reactor (1) was charged 265 grams of the low molecular weight polymer obtained above and the reaction was continued at 175° C./10 mm. Hg. for about 18 hours. The product was a tough rubber gum having a Mooney viscosity value of 51.

100 parts of the gum was milled on a standard rubber mill with the following:

|  | Pts. per 100 pts. gum |
| --- | --- |
| Carbon black | 40 |
| Calcium oxide | 4 |
| Mercaptobenzothiazole | 1.5 |
| Tetramethylthiuram disulfide | 1.5 |
| Sulfur | 0.8 |
| Zinc oxide | 5.0 |

The composition was cured by compressing molding for 15 minutes at 300° F followed by post-conditioning for about 15 hours at 100° C. in an oven. The elastomer had the following properties:

| Tensile, psi | 1030 |
| --- | --- |
| Elongation, % | 210 |
| Hardness, Shore A | 67 |
| Tear Strength, pli (Die C) | 130 |
| Tear Strength, pli (Split tear) | 19 |
| Brittle point, ° C (2) | −49 |

(1) High shear mixer sold by Atlantic Research Co., Gainesville, Va.
(2) Thermomechanical Analysis method using duPont Thermomechanical Analyzer

EXAMPLE 2

Thiodiethanol (366 grams, 3.0), 1,4-butanediol (180 grams, 2.0 moles), terephthalic acid (110 grams, 0.66 mole) and 1.5 grams phosphorous acid were reacted under nitrogen for 3 hours at 195° C. Monoallylether of trimethylolpropane (59 grams, 0.34 mole) was added and the reaction continued under nitrogen for 2.5 hours at 185° C.

55 grams of the above low molecular weight polymer was charged to an Atlantic 2CV reactor along with 0.1 gram p-toluene sulfonic acid and the reaction continued at 150°–160° C./5–10 mm. Hg. under nitrogen for 48 hours. The product was a gum having a Mooney value of 25.

The gum was compounded using the following formulation (parts per 100 parts gum)

|  | Parts by Weight |
| --- | --- |
| Carbon black | 40 |
| Calcium oxide | 2 |
| Mercaptobenzothiazole | 1.5 |
| Tetramethylthiuram disulfide | 1.5 |
| Sulfur | 0.8 |
| Zinc oxide | 5.0 | and cured by compression molding for 15 minutes at 300° F. and post-cured for about 18 hours at 100° C. The elastomer exhibited the following properties:

| Hardness, Shore A | 67 |
| --- | --- |
| Modulus, psi |  |
| at 100% elongation | 480 |
| at 200% elongation | 1110 |
| at 300% elongation | 1710 |
| Tensile, psi | 1770 |
| Elongation, % | 310 |
| Compression set, % | 10 |
| Volume Swell, %, in ASTM No. 3 oil: |  |
| 7 days at 150° C. Method B | 10.4, 18.5 |
| Brittle Point, ° C. | −51 |

EXAMPLE 3

Following a procedure similar to Example 2, thiodiethanol (150 grams, 1.25 moles), and terephthalic acid (45 grams, 0.3 mole) were condensed in the presence of 0.6 gram phosphorous acid for 4.5 hours at 190°–195° C. Trimethylolpropane monoallyl ether (16.5 grams, 0.1 mole) and 0.6 gram p-toluene sulfonic acid were then added and the reaction continued at 170° C. for 2 hours.

60 grams of the syrup resulting from the above reaction was then reacted in the presence of 0.3 mol. of a 48% solution of fluoboric acid at 150°–160° C./5–10 mm. Hg under a nitrogen atmosphere, using an Atlantic 2CV reactor, to give an elastomeric gum having a Mooney value of 25.

When the gum is compounded as described in Example 2 except for the use of 2 grams of calcium carbonate instead of calcium oxide, similar properties are obtained.

Similar results are obtained when terephthalic acid is replaced by hexahydro-p-phthalic acid.

We claim:
1. A vulcanizable elastomeric composition comprising the polymeric condensation reaction product of 80 to 90 mole percent of a mixture of thiodiethanol and one or more aliphatic or cycloaliphatic diols and, correspondingly, from 20 to 10 mole percent of an aromatic or cycloaliphatic dicarboxylic acid wherein at least 50 mole percent of the diol content is thiodiethanol and from about 1 to 10 mole percent of the diol content is a diol which provides an allylic double bond in a group pendant from the polymeric chain, said reaction product having a Mooney value of about 20 to 60.

2. The composition of claim 1 wherein an aliphatic or cycloaliphatic diol free of sulfur and allylic unsaturation constitutes up to about 40 mole percent of said diol content.

3. The composition of claim 1 wherein said aromatic dicarboxylic acid is terephthalic acid.

4. The composition of claim 1 wherein said diol which provides an allylic double bond is the monoallyl ether of trimethylol propane.

* * * * *